(12) United States Patent
Adams, Jr. et al.

(10) Patent No.: US 7,793,212 B2
(45) Date of Patent: Sep. 7, 2010

(54) SYSTEM AND METHOD FOR ANNOTATING MULTI-MODAL CHARACTERISTICS IN MULTIMEDIA DOCUMENTS

(75) Inventors: Hugh W. Adams, Jr., Wappingers Falls, NY (US); Giridharen Iyengar, Mahopac, NY (US); Ching-Yung Lin, Forest Hills, NY (US); Chalapathy V. Neti, Yorktown Heights, NY (US); John R. Smith, New Hyde Park, NY (US); Belle L. Tseng, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 10/539,890

(22) PCT Filed: Dec. 19, 2003

(86) PCT No.: PCT/US03/40726

§ 371 (c)(1),
(2), (4) Date: Mar. 16, 2006

(87) PCT Pub. No.: WO2004/059536

PCT Pub. Date: Jul. 15, 2004

(65) Prior Publication Data

US 2006/0218481 A1    Sep. 28, 2006

Related U.S. Application Data

(63) Continuation of application No. 10/325,061, filed on Dec. 20, 2002, now abandoned.

(51) Int. Cl.
*G06F 17/00* (2006.01)
(52) U.S. Cl. ........................... 715/233; 715/203
(58) Field of Classification Search ............. 707/512; 345/302; 715/723, 200, 731, 230–233, 202–203

See application file for complete search history.

(56) References Cited

U.S. PATENT DOCUMENTS 5,524,193 A * 6/1996 Covington et al. ......... 715/512

(Continued)

FOREIGN PATENT DOCUMENTS

JP    06-043839    2/1994

(Continued)

OTHER PUBLICATIONS

Sevasti et al., 2000, ACM multimedia, 1-58113-198-4/00/10, pp. 187-194.*

(Continued)

*Primary Examiner*—Stephen S Hong
*Assistant Examiner*—Manglesh M Patel
(74) *Attorney, Agent, or Firm*—Ference & Associates LLC

(57) ABSTRACT

A manual annotation system of multi-modal characteristics in multimedia files. There is provided an arrangement for selection an observation modality of video with audio, video without audio, audio with video, or audio without video, to be used to annotate multimedia content. While annotating video or audio features is isolation results in less confidence in the identification of features, observing both audio and video simultaneously and annotating that observation results in a higher confidence level.

10 Claims, 4 Drawing Sheets

U.S. PATENT DOCUMENTS

| | | | | |
|---|---|---|---|---|
| 5,583,980 | A | * 12/1996 | Anderson | 715/500.1 |
| 5,600,775 | A | * 2/1997 | King et al. | 715/500 |
| 5,838,313 | A | * 11/1998 | Hou et al. | 715/201 |
| 6,006,241 | A | * 12/1999 | Purnaveja et al. | 715/205 |
| 6,154,600 | A | * 11/2000 | Newman et al. | 386/4 |
| 6,332,144 | B1 | * 12/2001 | deVries et al. | 707/102 |
| 6,484,156 | B1 | * 11/2002 | Gupta et al. | 707/1 |
| 6,546,405 | B2 | * 4/2003 | Gupta et al. | 715/512 |
| 6,956,593 | B1 | * 10/2005 | Gupta et al. | 715/751 |
| 7,111,009 | B1 | * 9/2006 | Gupta et al. | 707/102 |

FOREIGN PATENT DOCUMENTS

| | | |
|---|---|---|
| JP | 10-177511 | 6/1998 |
| JP | 2002-057981 | 2/2002 |

OTHER PUBLICATIONS

Sonic Foundry, Vegas 2.0 Users Manual, 2000, Sonic Foundry, pp. 1-411 (in PDF Format).*

* cited by examiner

SYSTEM AND METHOD FOR ANNOTATING MULTI-MODAL CHARACTERISTICS IN MULTIMEDIA DOCUMENTS

This application is a National State filing of PCT/US03/40726, which is a continuation of U.S. application Ser. No. 10/325,061, filed Dec. 20, 2002, now abandoned.

FIELD OF THE INVENTION

The present invention relates to the computer processing of multimedia files. More specifically, the present invention relates to the manual annotation of multi-modal events, objects, scenes, and audio occurring in multimedia files.

BACKGROUND OF THE INVENTION

Multimedia content is becoming more common both on the World Wide Web and local computers. As the corpus of multimedia content increases, the indexing of features within the content becomes more and more important. Observing both audio and video simultaneously and annotating that observation results in a higher confidence level.

Existing multimedia tools provide capabilities to annotate either audio or video separately, but not as a whole. (An example of a video-only annotation tool is the IBM MPEG7 Annotation Tool, inventors J. Smith et al., available through www.alphaworks.ibm.com/tech/videoannex. Other conventional arrangements are described in: Park et al, "iMEDIA-CAT: Intelligent Media Content Annotation Tool", Proc. International Conference on Inductive Modeling (ICIM) 2001, South Korea, November, 2001; and Minka et al., "Interactive Learning using a Society of Models," Pattern Recognition, Vol. 30, pp. 565, 1997, TR #349.

It has long been recognized that annotating video or audio features in isolation results in a less confidence of the identification of the features.

In view of the foregoing, a need has been recognized in connection with providing improved systems and methods for observing and annotating multi-modal events, objects, scenes, and audio occurring in multimedia files.

SUMMARY OF THE INVENTION

In accordance with at least one presently preferred embodiment of the present invention, there are broadly contemplated multimedia annotation systems and methods that permit users to observe solely video, video with audio, solely audio, or audio with video and to annotate what has been observed.

In one embodiment, there is provided a computer system which has one or more multimedia files that are stored in a working memory. The multi-modal annotation process displays a user selected multimedia file, permits the selection of a mode or modes to observe the file content, annotates the observations; and saves the annotations in a working memory (such as a MPEG-7 XML file).

In summary, one aspect of the invention provides an apparatus for managing multimedia content, the apparatus comprising: an arrangement for supplying multimedia content; an input interface for permitting the selection, for observation, of at least one of the following modes associated with the multimedia content: an audio portion that includes video; and a video portion that includes audio; and an arrangement for annotating observations of a selected mode.

A further aspect of the invention provides a method of managing multimedia content, the method comprising the steps of: supplying multimedia content; permitting the selection, for observation, of at least one of the following modes associated with the multimedia content: an audio portion that includes video; and a video portion that includes audio; and annotating observations of a selected mode.

Furthermore, an additional aspect of the invention provides a program storage device readable by machine, tangibly embodying a program of instructions executable by the machine to perform method steps for managing multimedia content, the method comprising the steps of: supplying multimedia content; permitting the selection, for observation, of at least one of the following modes associated with the multimedia content: an audio portion that includes video; and a video portion that includes audio; and annotating observations of a selected mode.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
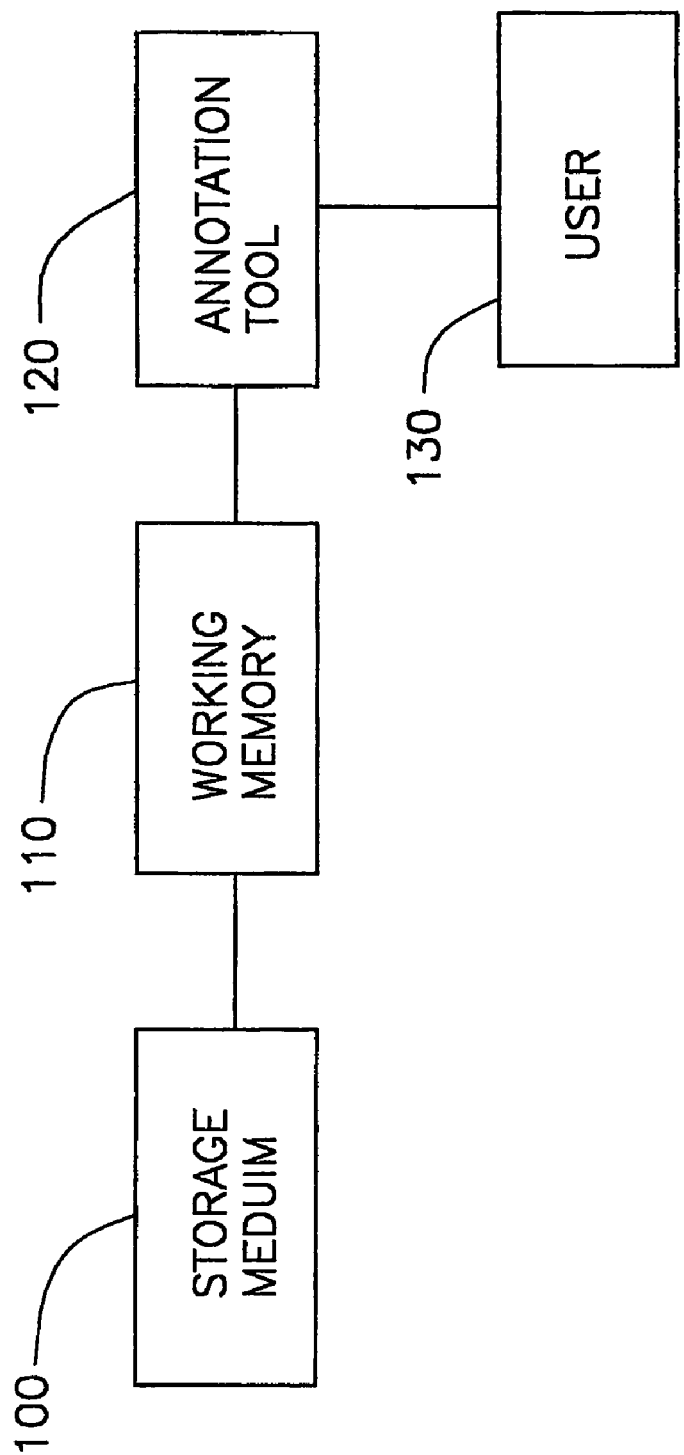
FIG. 1 is a block diagram depicting a multi-modal annotation system.

FIG. 1 is a block diagram of one preferred embodiment of a multi-modal annotation system in accordance with the present invention. The multimedia content and previous annotations are stored on the storage medium 100. When a user 130 selects a multimedia file via the annotation tool from the storage medium 100, it is loaded into working memory 110 and portions of it displayed in the annotation tool 120. At any time, the user 130 may also request that previously saved annotations associated with the current multi-modal file be loaded from the storage medium 100 into working memory 110. The user 100 views the multimedia data by making requests through the annotation tool 120. The user 130 then annotates his observations and the annotation tool 120 saves these annotations in working memory 110. The user can at anytime request the annotation tool 120 to save the annotation on the storage medium 100.

Figure 2:
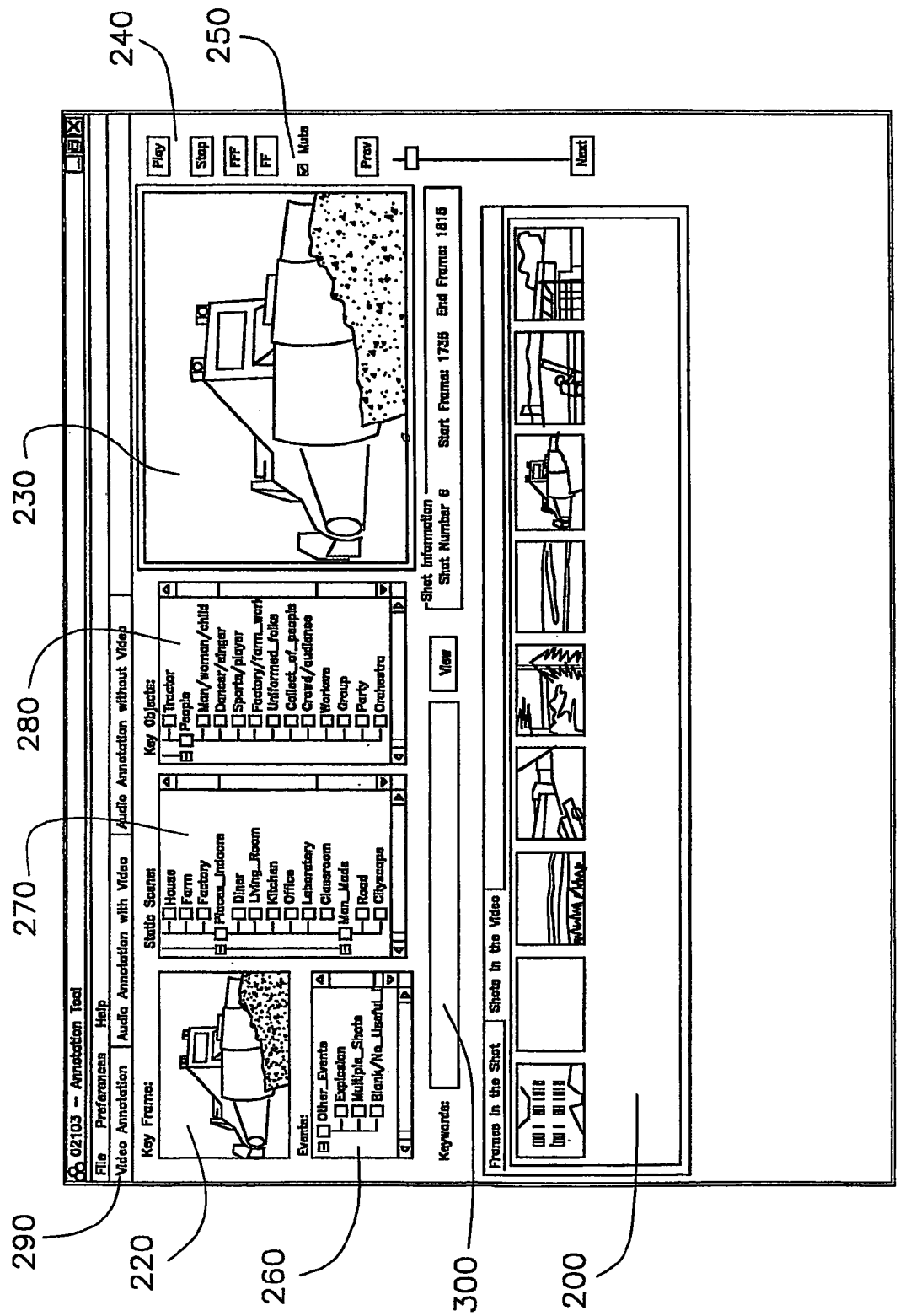
FIG. 2 is an illustration of a system annotating video scenes, objects, and events.

FIG. 2 is an illustration of a system annotating video scenes, objects, and events. (Simultaneous reference should also be made to FIG. 1.) The multimedia data has been loaded from the storage medium 100 into working memory 110. A video tab 290 has been selected. The multimedia video has been segmented using scene changed detection into shots. A shot list window 200 displays a portion of the shots in the multimedia. Here, the user 130 has selected a shot 210 which is highlighted in the shot list window 200. A key frame 220, which is a representative shot in the frames of a shot, is preferably displayed. In addition, the frames of the shot maybe viewed in the video window 230 using play controls 240. The video can be viewed lo with or without audio depending upon the selection of a mute button 250. The user 130 may select annotations for this shot by clicking the boxes in events 260, static scenes 270, or key objects 280 lists of boxes. Any significant observations which are not contained in the check boxes can be noted in a keywords text box 300.

Figure 3:
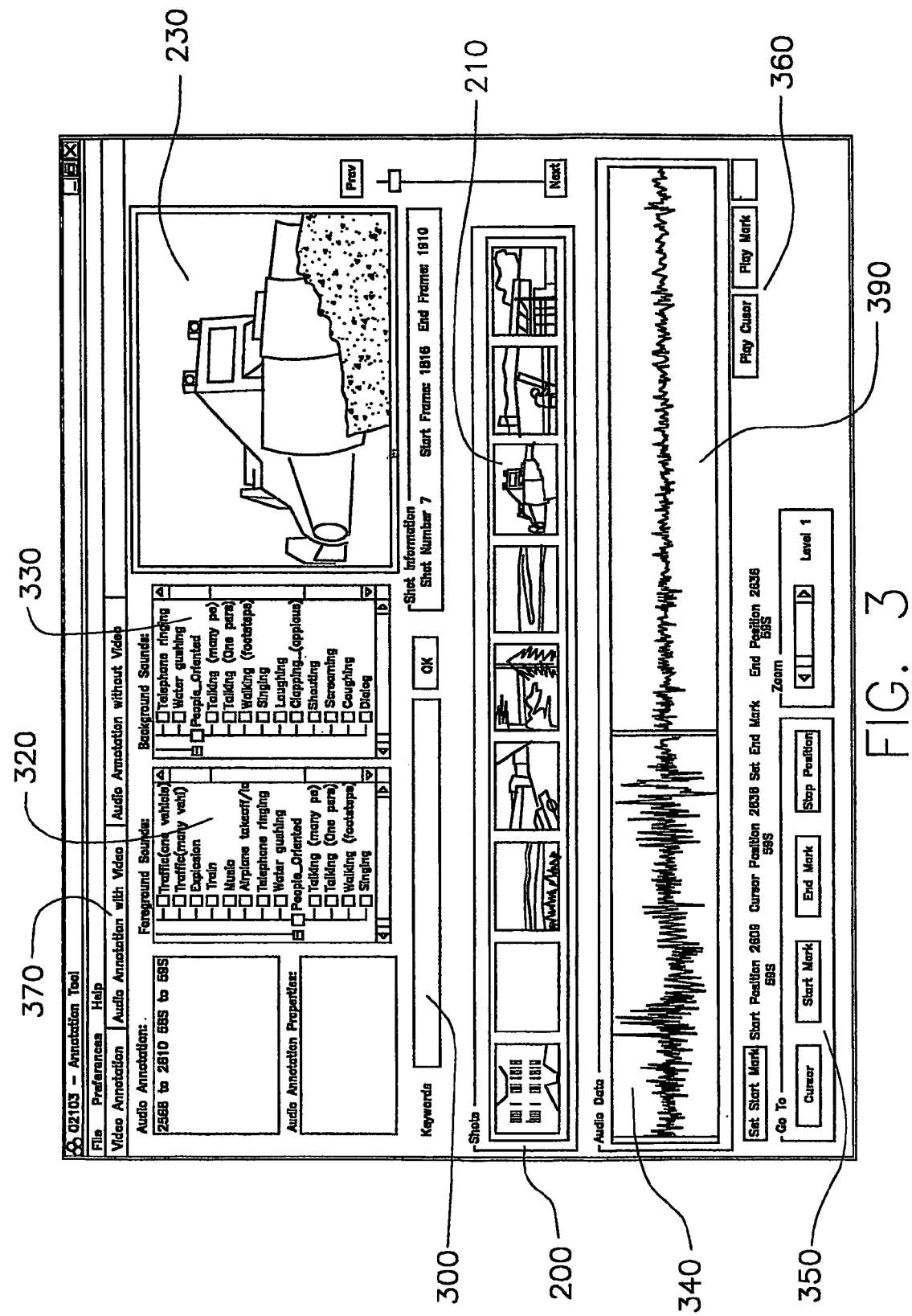
FIG. 3 is an illustration of a system annotating audio with video.

FIG. 3 is an illustration of the system annotating audio with video. (Simultaneous reference should also be made to FIG. 1.) The multimedia data has been loaded from the storage medium 100 into working memory 110. The audio with video tab 370 has been selected. The multimedia video has been segmented using scene change detection into shots. The shot list window 200 displays a portion of the shots in the multimedia. The shot 210 associated with the current audio position is highlighted in the shot list window 200. The audio data is displayed in the window 390. A segment of audio 340 has been delimited for annotation; that is, the limits or bounds of the audio has been fixed for subsequent annotation. The video associated with the audio is shown in 230. As the user 130 uses the play controls 360, the audio data display 390 is updated to display the current audio data and the video window 230 changes to reflect the current video frame. Thus, the user 130 may observe the video and simultaneously hear the audio while making audio annotations. The user 130 preferably uses the buttons 350 to delimit audio segments. Check boxes corresponding to the foreground sounds (320) (the most prominent sounds in the segment) and background sounds (330) (sounds which are present but are secondary to other sounds) may be checked to indicated sounds heard within the audio segment 340. Any significant observations which are not contained in the check boxes can be noted in keywords text box 300.

Figure 4:
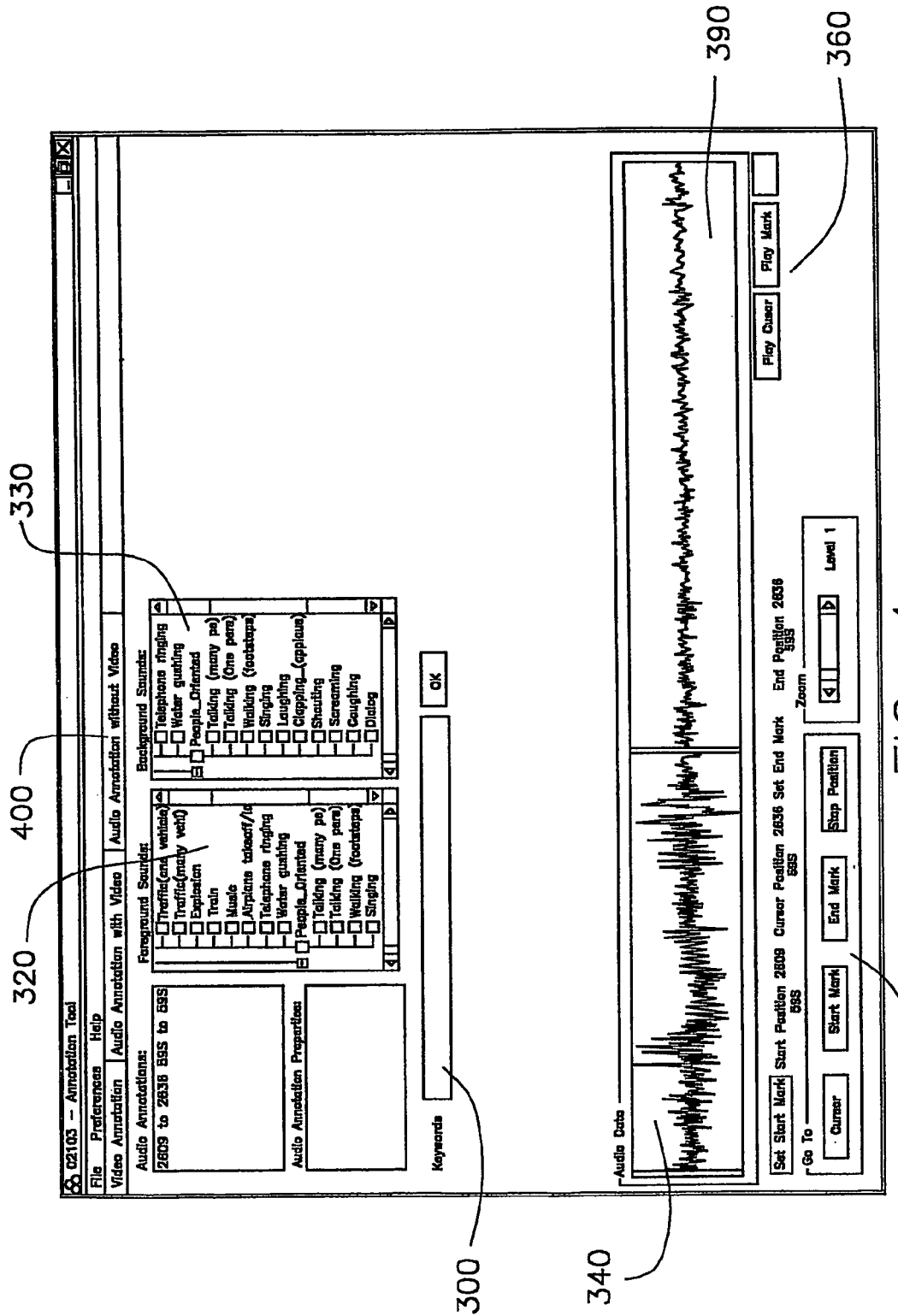
FIG. 4 is an illustration of a system annotating audio without video.

FIG. 4 is an illustration of the system annotating audio without video. (Simultaneous reference should be made to FIG. 1.) The multimedia data has been loaded from the storage medium 100 into working memory 110. Audio-without-video tab 400 has been selected. The audio data is displayed in the window 390. A segment of audio 340 has been delimited for annotation. As the user 130 uses the play controls 360, the audio data display 390 is updated to display the current audio data. Thus, the user 130 may only hear the audio while making audio annotations. The user 130 uses the buttons 350 to delimit audio segments. The check boxes for foreground sounds 320 and background sounds 330 may be checked to indicate sounds heard within the audio segment 340. Any significant observations which are not contained in the check boxes can be noted in the keywords text box 300.

It is to be understood that the present invention, in accordance with at least one presently preferred embodiment, includes an arrangement for supplying multimedia 5 content, an input interface for permitting the selection, for observation, of a mode associated with the multimedia content, and an arrangement for annotating observations of a selected mode. Together, these elements may be implemented on at least one general-purpose computer running suitable software programs. These may also be implemented on at least one Integrated Circuit or part of at least one Integrated lo Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for managing multimedia content, said apparatus comprising:
   a processor;
   an arrangement for supplying multimedia content;
   an input interface for permitting a selection, for observation, of at least one of the following modes associated with the multimedia content: an audio portion that includes video; and a video portion that includes audio; and
   an arrangement for labeling observations of a selected mode;
   wherein said arrangement for labeling observations of a selected mode comprises:
   an arrangement for assigning semantic, multimedia content-based labels to segments of said observations of a selected mode;
   wherein said arrangement for assigning semantic, multimedia content-based labels is configured to:
   provide a label from a predefined set of multimedia content descriptors; and
   assign a new label not present in said predefined set of multimedia content descriptors; and
   an arrangement permitting a user to label audio while viewing video having:
   a check box for labeling foreground sounds;
   a check box for labeling background sounds; and
   a keyword text box arrangement; and
   an arrangement for storing said semantic, multimedia content-based labels with the multimedia content.

2. The apparatus according to claim 1, wherein said input interface permits the selection, for observation, of both of the following associated with the multimedia content: an audio portion that includes video; and a video portion that includes audio.

3. The apparatus according to claim 1, wherein said input interface additionally permits the selection, for observation, of solely a video portion of multimedia content.

4. The apparatus according to claim 1, wherein said input interface additionally permits the selection, for observation, of solely an audio portion of multimedia content.

5. The apparatus according to claim 1, wherein said arrangement for supplying multimedia content comprises a working memory which stores labeled multimedia files in an industry standard format.

6. The apparatus according to claim 1, wherein said input interface is adapted to: first permit the selection of a multimedia file and then permit the selection of said at least one of: an audio portion simultaneously with video; and a video portion simultaneously with audio.

7. The apparatus according to claim 1, further comprising a working memory for saving the labeled observations of a selected mode.

8. The apparatus according to claim 1, wherein said input interface is adapted to permit the selection, for observation, at least the following mode associated with the multimedia content: a video portion that includes audio.

9. The apparatus according to claim 8, wherein said input interface comprises:
   an arrangement for permitting the selection, for observation, of a video mode of multimedia content; and
   an arrangement for selectably adding audio to the video mode for observation.

10. A program storage device readable by machine, tangibly embodying a program of instructions executable by the machine to perform method steps for managing multimedia content, said method comprising the steps of:

supplying multimedia content;
permitting a selection, for observation, of at least one of the following modes associated with the multimedia content: an audio portion that includes video; and a video portion that includes audio;
labeling observations of a selected mode; and
assigning semantic, multimedia content-based labels to segments of said observations of a selected mode;
   wherein said assigning semantic, multimedia content-based labels comprises performing:

selecting a label from a predefined set of multimedia content descriptors; and
assigning a new label not present in said pre-defined set of multimedia content descriptors;
labeling audio while viewing video via: one or more check boxes configured for labeling foreground and background sounds, and a keyword text box; and
storing said semantic, multimedia content-based labels with the multimedia content.

* * * * *